(12) United States Patent
Islam Ahmad

(10) Patent No.: US 10,429,212 B2
(45) Date of Patent: Oct. 1, 2019

(54) POSITION SENSOR DETECTING A MECHANICAL PULSE CONDUCTED BY A WAVEGUIDE FORMED OF MAGNETOSTRICTIVE MATERIAL

(71) Applicant: SICK ATECH GMBH, Witten (DE)

(72) Inventor: Saiful Islam Ahmad, Lüdenscheid (DE)

(73) Assignee: SICK ATECH GMBH, Witten (DE)

( * ) Notice: Subject to any disclaimer, the term of this patent is extended or adjusted under 35 U.S.C. 154(b) by 108 days.

(21) Appl. No.: 15/717,177

(22) Filed: Sep. 27, 2017

(65) Prior Publication Data
US 2018/0087934 A1 Mar. 29, 2018

(30) Foreign Application Priority Data
Sep. 29, 2016 (DE) .......................... 10 2016 118 524

(51) Int. Cl.
*G01B 7/14* (2006.01)
*G01D 5/48* (2006.01)
*G01H 11/04* (2006.01)

(52) U.S. Cl.
CPC ............. *G01D 5/485* (2013.01); *G01H 11/04* (2013.01)

(58) Field of Classification Search
CPC ........ G01B 7/003; G01B 17/00; G01D 5/485; G01D 11/30; G01D 11/245
See application file for complete search history.

(56) References Cited

U.S. PATENT DOCUMENTS

| | | |
|---|---|---|
| 4,958,332 A | 9/1990 | Tellerman |
| 5,736,855 A | 4/1998 | Smith |
| 6,194,891 B1 * | 2/2001 | Begin .................... G01B 7/003 324/207.13 |
| 6,232,769 B1 | 5/2001 | Brunsch et al. |

(Continued)

FOREIGN PATENT DOCUMENTS

| | | |
|---|---|---|
| DE | 19753805 C2 | 6/1999 |
| DE | 69634988 T2 | 5/2006 |

(Continued)

OTHER PUBLICATIONS

Brochure "Temposonics Position Sensors", 551019, MTS Sensors Group (www.mtssensors.com/fileadmin/media/pdfs/551019.pdf).

(Continued)

*Primary Examiner* — Minh N Tang
(74) *Attorney, Agent, or Firm* — Nath, Goldberg & Meyer; Jerald L. Meyer; Stanley N. Protigal

(57) ABSTRACT

A position sensor comprises a waveguide of magnetostrictive material which extends along a measurement path and which is configured for conducting mechanical pulses triggered by magnetostriction. A transducer at a first end of the waveguide serves for coupling a current pulse into the waveguide and for detecting a mechanical pulse conducted by the waveguide in the direction of the transducer. A damping element of an elastomer material is provided at a second end of the waveguide for damping a mechanical pulse propagating in the direction of the second end, wherein the hardness of the elastomer material increases as the distance from the transducer increases. The invention furthermore relates to a method of manufacturing a damping element of such a position sensor.

9 Claims, 5 Drawing Sheets

(56) References Cited

U.S. PATENT DOCUMENTS

| | | | |
|---|---|---|---|
| 6,404,183 B1 | 6/2002 | Piana | |
| 6,903,544 B2* | 6/2005 | Kurz | G01D 5/485 |
| | | | 324/207.13 |
| 2001/0017539 A1 | 8/2001 | Brunsch et al. | |
| 2005/0046513 A1* | 3/2005 | Raphalovitz | G01D 5/485 |
| | | | 333/148 |
| 2005/0132807 A1 | 6/2005 | Steinich et al. | |

FOREIGN PATENT DOCUMENTS

| | | |
|---|---|---|
| DE | 202006012815 U1 | 1/2008 |
| DE | 102009006447 A1 | 7/2010 |
| EP | 1524504 A2 | 4/2005 |
| EP | 0882212 B1 | 7/2005 |
| JP | 2002504221 A | 2/2002 |
| JP | 2006133086 A | 5/2006 |
| JP | 201246033 A | 3/2012 |
| JP | 201513834 A | 1/2015 |

OTHER PUBLICATIONS

Official Communication dated Jun. 16, 2017 issued in corresponding German Application No. 10 2016 118 524.8.
European search report dated Jan. 26, 2018 for corresponding application No. EP17190668.
The First Office Action dated Jun. 13, 2019 corresponding to Chinese application No. 2017108984869.

* cited by examiner

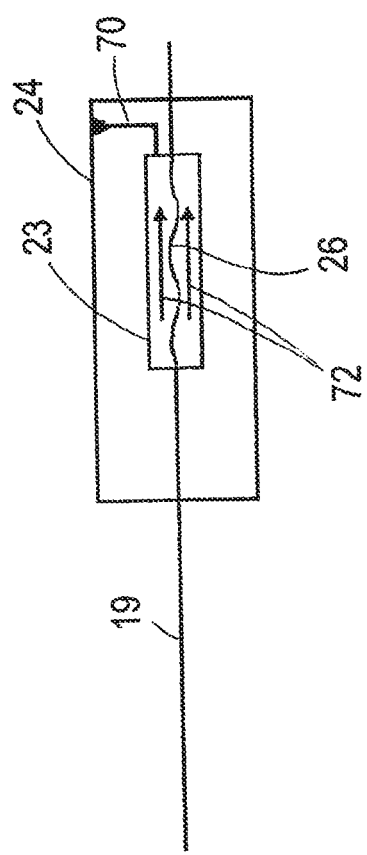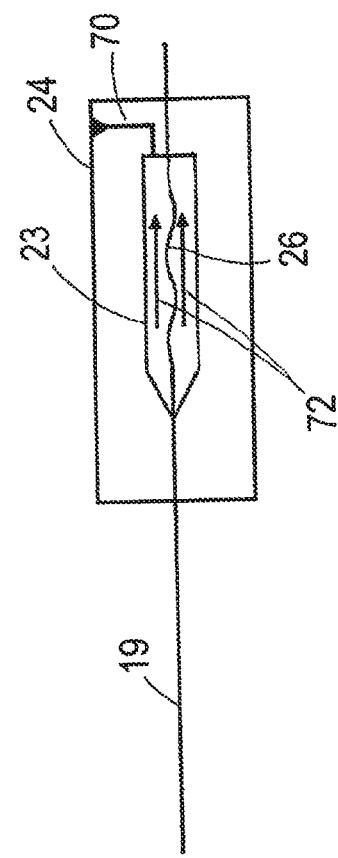

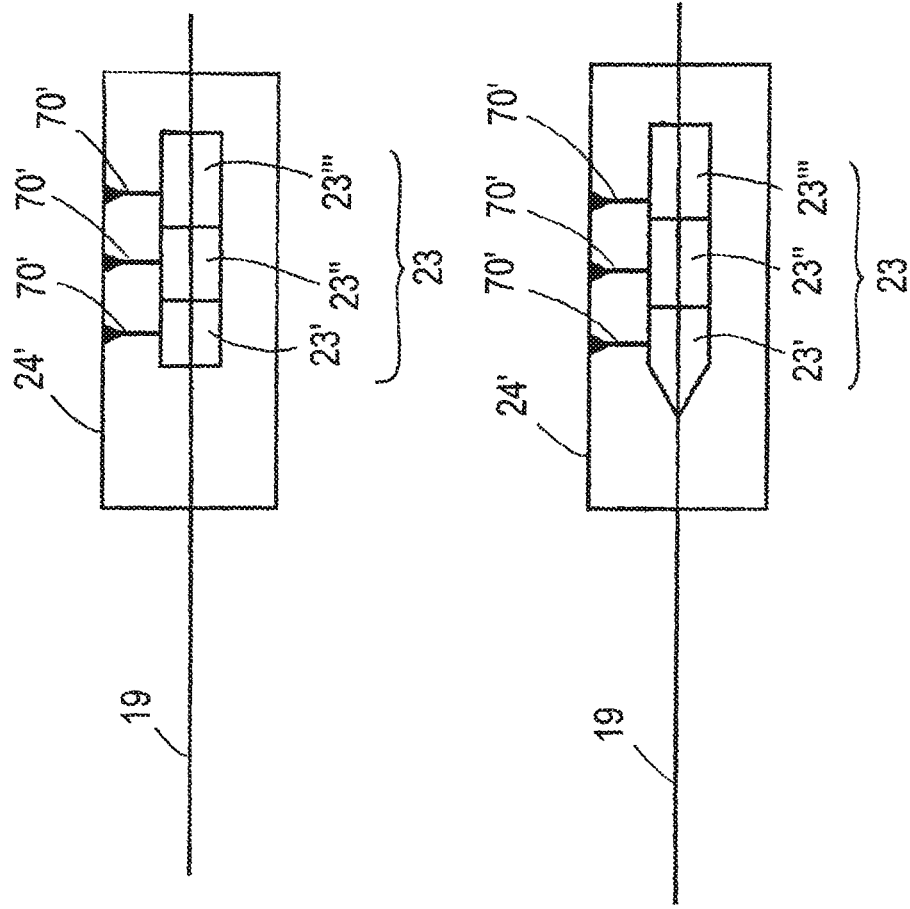

POSITION SENSOR DETECTING A MECHANICAL PULSE CONDUCTED BY A WAVEGUIDE FORMED OF MAGNETOSTRICTIVE MATERIAL

FIELD

The present invention relates to a position sensor having a waveguide of a magnetostrictive material, which extends along a measurement path and which is configured for conducting mechanical pulses triggered by magnetostriction, and to a method of manufacturing a damping element at the waveguide of such a position sensor.

BACKGROUND

Such sensors are disclosed by way of example in DE 197 53 805 C2 and in the brochure "Temposonics Position Sensors", 551019 A of the company MTS (www.mtssensors.com/fileadmin/media/pdfs/551019.pdf) and are in particular used in industrial metrology to measure positions, lengths or covered distances. The waveguide can be a thin bar, a wire or a pipe of a ferromagnetic material such as iron, nickel or cobalt which can have a length of a few centimeters up to a plurality of meters, for example. A so-called "position magnet", for example in the form of a permanent magnet, which generates a magnetic field in the waveguide is typically attached to the component whose position should be detected. The position magnet can, for example, be of ring shape and surround the waveguide. If an electrical current pulse is sent through the waveguide, a further magnetic field which is variable with respect to time and place is generated in the environment of the waveguide in addition to the magnetic field generated by the position magnet. Due to the interaction of the two magnetic fields at the site of the position magnet, a mechanical pulse such as a longitudinal pulse and/or a torsion pulse can be generated in the waveguide and moves along the measurement path. A transducer of the position sensor typically serves to convert the mechanical pulses conducted by the waveguide into position signals. The transducer can, for example, comprise a coil or a piezoelectric measurement element. The transducer can, for example, be designed as described in EP 0 882 212 B1. The position of the position magnet can ultimately be determined by a measurement of the travel time of the mechanical pulse. Position sensors based on the magnetostrictive measurement principle work in a contactless manner and supply absolute values. They do not require a recalibration and they are also suitable for adverse conditions of use. They are frequently configured as linear path sensors. An application of such position sensors within hydraulic cylinders in order to detect their piston setting is described in DE 20 2006 012 815 U1, for example.

The described longitudinal pulses or torsion pulses move in the waveguide in both directions away from the position of the position magnet. At the one end of the waveguide, they are detected with the aid of the transducer in order to determine the current position of the position magnet along the waveguide using the described measurement of the travel time. At the other end, it has to be prevented as effectively as possible that the pulse is reflected and propagates back along the waveguide. This would interfere with the detection of the pulse propagating directly in the direction of the transducer or would make it ambiguous.

Elastomer sleeves are described in EP 0 882 212 B1 for this purpose and are plugged onto the end of the waveguide remote from the transducer. Elastomers having different properties can be plugged on after one another in order to adapt the damping effect. For example, a sleeve of a soft elastomer which keeps the reflection small can first be provided. It can be followed by sleeves of a harder elastomer having a greater damping. Such damping elements, however, require the expensive and complicated pushing of the sleeves onto waveguides which are as a rule configured as wires.

In other known solutions, an elastomer material is cast around the waveguide in a casting mold or is applied in an injection molding process, wherein a sleeve of an elastomer having homogenous properties is produced in the process.

A position sensor is disclosed in DE 197 53 805 C2 in which the waveguide is supported in a support of insulating material. On the assembly, a pressing sleeve is pressed onto the axial end region of the waveguide together with the insulating material.

DE 696 34 988 T2 discloses a waveguide suspension device for an acoustic converter, said device comprising a suspension sleeve and a damping element. The damping element has an inner sleeve and a pressure means for pressing together the inner sleeve and is arranged between the suspension sleeve and the remote end of the waveguide.

SUMMARY

It is an object of the invention to provide a position sensor which can easily be manufactured and which has an as reliable as possible damping of the pulse at the end of the waveguide propagating away from the transducer.

The object is satisfied by a position sensor comprising a waveguide of magnetostrictive material which extends along a measurement path, and configured for conducting mechanical pulses triggered by magnetostriction. A transducer is arranged at a first end of the waveguide, and is configured to couple a current pulse into the waveguide and to detect a mechanical pulse conducted by the waveguide in the direction of the transducer. A damping element of an elastomer material is arranged at a second end of the waveguide, and is configured to damp a mechanical pulse propagating in the direction of the second end. The hardness of the elastomer material increases as the distance from the transducer increases. The elastomer material is formed directly at the waveguide with the aid of a casting process, and comprises at least two components whose mixing ratio determines the hardness of the elastomer material.

A position sensor in accordance with the invention has a waveguide of magnetostrictive material which extends along a measurement path and which is configured for conducting mechanical pulses triggered by magnetostriction. At a first end of the waveguide, the transducer is provided with whose aid a current pulse can be coupled into the waveguide and mechanical pulses conducted by the waveguide in the direction of the transducer can be detected. As described, such a mechanical pulse arises in a manner known per se through the reciprocal effect of the magnetic field, which is generated in the waveguide by the current pulse, with a position magnet whose position should be detected.

The transducer serves for coupling the necessary current pulse into the waveguide, on the one hand, and for detecting the mechanical pulse which is generated in this manner and which moves in the direction of the transducer, on the other hand. The distance of the position magnet generating the reflection can be concluded from the travel time of this mechanical pulse.

A damping element of an elastomer material is provided at a second end of the waveguide and serves for damping a mechanical pulse propagating in the direction of the second end. This damping element should keep the reflection of this second mechanical pulse as small as possible such that the latter does not interfere with the detection of the mechanical pulse transmitted in the direction of the transducer.

In the position sensor configured in accordance with the invention, the damping element is formed directly onto the waveguide with the aid of a casting process, wherein the hardness of the elastomer material increases as the distance from the transducer increases. Whereas the manufacture using a casting process is possible in a very simple and precise manner, a corresponding hardness profile can be set very easily thereby in an axial direction of the waveguide. Due to the increasing hardness of the elastomer material the larger the distance from the transducer is, it can e.g. be achieved that the mechanical pulse to be damped in the waveguide is first incident at elastomer material having a smaller hardness such that the reflections are already reduced. Due to the increasing hardness of the elastomer material in the damping element, the damping becomes larger at an increased distance from the transducer such that a desired damping behavior, which has a large effectiveness, can be set in an easy manner.

The invention is particularly suitable in connection with waveguides which are configured for conducting torsion pulses triggered by magnetostriction.

In order to set the material properties of the damping element in the axial direction of the waveguide in this manner, provision is made in accordance with the invention that the elastomer material of the damping element comprises at least two components whose mixing ratio determines the hardness of the elastomer material. With such a material, the desired hardness or the desired hardness extent of the damping element along the waveguide can be set very simply.

The corresponding material can e.g. be a mixture of two different components whose hardness is determined by the mixing ratio of the two components after the hardening process subsequent to the casting process.

Silicone, in particular multicomponent silicone, is suitable, for example. Other materials such as polyurethane are likewise conceivable.

The hardness of the elastomer material used for the damping element can change step-wise in the axial direction. However, it is particularly advantageous if the hardness in the axial direction changes continuously, in particular increases linearly, with the spacing from the transducer. If the hardness of the elastomer material of the damping element changes on the basis of the mixing ratio of the different components used, this can be achieved in a simple manner in that the mixing ratio changes continuously with the distance from the transducer.

It is generally possible for the elastomer material of the damping element to be formed as a cast part around the waveguide. A particularly precise damping element having a specific change of the hardness as the spacing from the transducer increases is formed at the waveguide by an injection molding process.

In a particularly advantageous further development of the position sensor in accordance with the invention, the waveguide is configured to be of non-linear shape in the region of the damping element. Provision can instead, for example, be made that the waveguide extends in a wave-shaped, spiral-shaped or helical-shaped manner in this region. In this manner, the damping path increases such that a mechanical pulse to be damped remains within the damping element for a longer time while it propagates there.

Such a design of the waveguide in the region of the damping element can be manufactured particularly simply using a casting process, in particular using an injection molding process, since it is not necessary to plug an elastomer sleeve onto the waveguide, which is hardly possible with a waveguide region of non-linear shape. A damping element manufactured using a casting process nevertheless fixedly contacts the waveguide of non-linear shape.

The invention also relates to a method of manufacturing a damping element of a position sensor which is configured in accordance with the invention.

In the method in accordance with the invention, the elastomer material of the damping element is cast around the second end of the waveguide in a casting process. A particularly simple and precise method uses an injection molding process.

The invention provides that the hardness of the damping element increases with the spacing from the transducer in that a material is used in the casting process which comprises two different components whose mixing ratio is set along the damping element to be cast in dependence on the spacing from the transducer. If two components are used for this purpose whose hardness differs after the hardening process, the hardness of the damping element can be selected very precisely by the setting of the mixing ratio.

Advantageous and preferred aspects of the method in accordance with the invention result from the above description of the advantages and from preferred embodiments of the position sensor in accordance with the invention.

BRIEF DESCRIPTION OF THE DRAWINGS

The invention will be described in the following by way of example with reference to the drawings.

FIG. 3 is a schematic representation of a damping element of a first embodiment of the position sensor;

FIG. 4 is a schematic representation of a damping element of a second embodiment of the position sensor;

FIG. 7 is a schematic representation of a damping element of a fifth embodiment of the position sensor; and FIG. 8 is a schematic representation of a damping element of a sixth embodiment of the position sensor.

DETAILED DESCRIPTION

Figure 1:
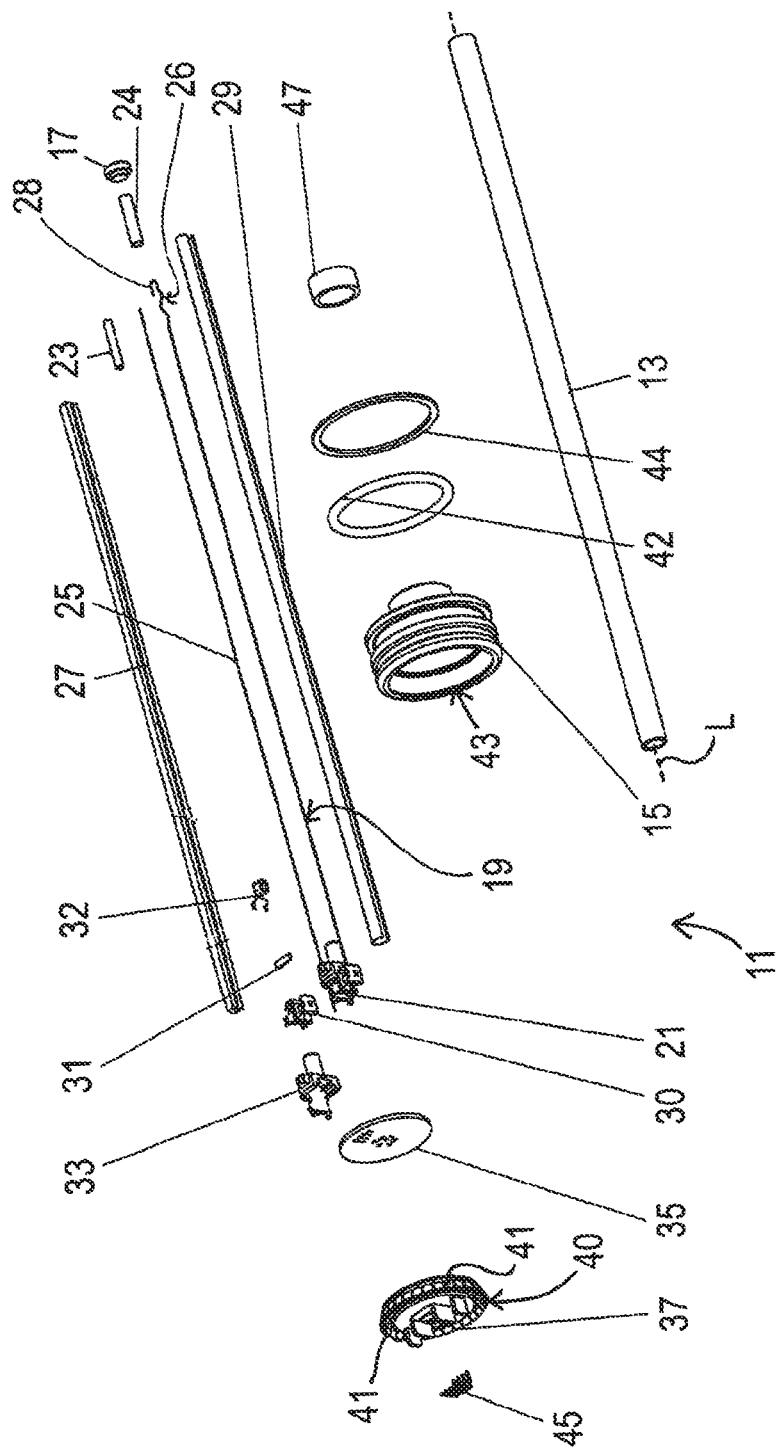
FIG. 1 is an exploded representation of a position sensor in accordance with the invention.

The position sensor 11 shown in an exploded representation in FIG. 1 comprises a waveguide housing 13 in the form of an elongated pipe of stainless steel to whose one pipe end a sensor head housing 15 is attached. The other pipe end is closed by an end cap 17. A waveguide 19 of a magnetostrictive material is located in the waveguide housing 13. The waveguide 19 is preferably a wire of ferromagnetic material and, starting from a control unit 21, extends axially, that is in parallel with the longitudinal axis L of the waveguide housing 13 and through said waveguide housing up to a damping element 23 which is held in the waveguide housing 13 using a sleeve 24. The sleeve 24 can, for example, be the injection mold in which the damping element 23 is cast in a shape still to be described. In the region of the damping element 23, the waveguide 19 merges over a bent region 28 into a return conductor 25 which again leads back to the control unit 21. The waveguide 19 is held in the waveguide housing 13 by means of a positioning element 27 and an intermediate pipe 29. The waveguide 19 is configured as having the shape of a wave in the region of the damping element 23 in order to extend the damping path.

A transducer 30 is associated with the control unit 21 and comprises a bar magnet 31, which is fixedly soldered to the waveguide 19, and a coil 32 surrounding said bar magnet. The transducer 30 can convert torsion pulses conducted by the waveguide 19 into electrical position signals, such as is generally known, for example from EP 0 882 212 B1. A transducer receiver 33 is associated with the transducer 30 and, like the control unit 21, is attached to a circuit board 35. In FIG. 1, the following individual parts of the control unit 21 are, for reasons of clarity, shown separately again laterally next to the control unit 21: the transducer 30, bar magnet 31, coil 32 and transducer receiver 33.

The circuit board 35 with the components mounted thereat is accommodated in the sensor head housing 15. Said sensor head housing is closed by a cover part 37 which is provided with latching teeth 41 at its boundary 40. The latching teeth 41 are configured for engaging behind an inwardly projecting bead 43 of the sensor head housing 15. The cover part 37 can thus be plugged onto the sensor head housing 15 and can be permanently latched thereto on the plugging on. The sensor head housing 15 can be installed into a hydraulic cylinder using a sealing ring 42 and a support ring 44, such as is disclosed in DE 20 2006 012 815 U1, for example.

Contact pins 45 are provided at the cover part 37 for the connection of the position sensor 11 to a power supply and to a reception unit (both not shown). The contact pins are angled as shown in order to enable the connection of a connection plug or of a connection socket from the side. The position to be detected by the position sensor 11 is marked by a position magnet 47 which is of ring shape here and surrounds the waveguide housing 13. The position magnet 47 is fastened to a component which is not shown and whose position should be detected, e.g. to a displaceable piston of a hydraulic cylinder.

Figure 2:
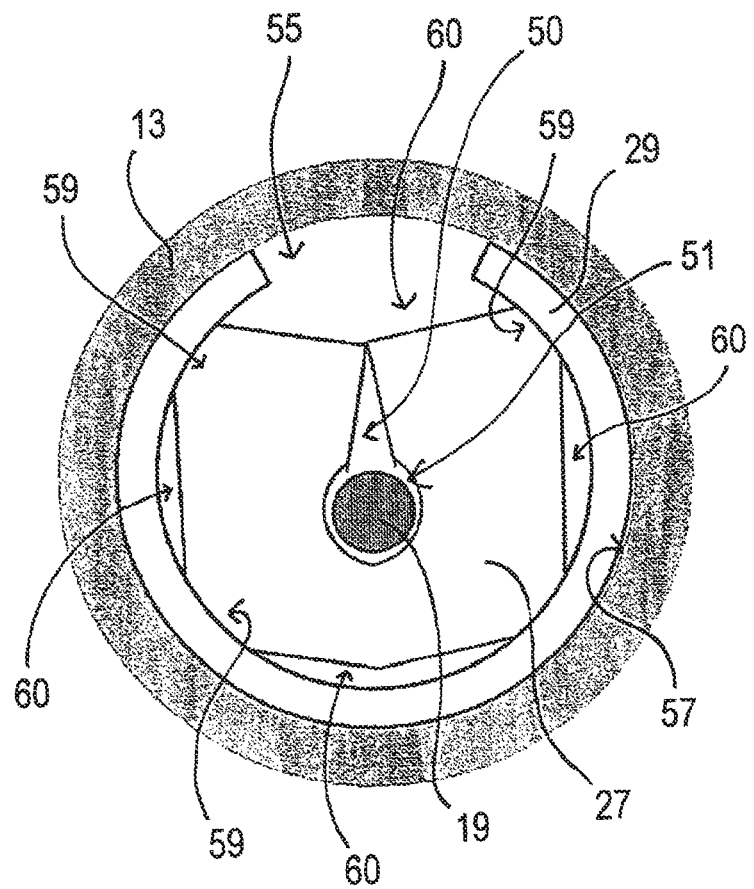
FIG. 2 is an explanatory cross-sectional representation of a waveguide in an installed state.

FIG. 2 shows the waveguide 19 and the positioning element 27 in a cross-sectional view in an installed state. The positioning element 27 is produced from an elastic and non-magnetic material, e.g. from silicone, and can therefore be deformed. If it is in the undeformed starting state not shown here, it has a trapazoidial-like outer cross-sectional shape. A recess 50 having a cross-sectional shape in the form of a keyhole extends through the entire positioning element 27 in the axial direction. The waveguide 19 is then arranged in the wide reception section 51 of the recess 50. In the installed state, which is shown in cross-section in FIG. 2, the positioning element 27 is pressed together and "jams" in the intermediate pipe 29 which is e.g. produced from polytetrafluoroethylene by causing the intermediate pipe 29 to expand by opening at gap 55. The unit formed by the waveguide 19, the positioning element 27 and the intermediate pipe 29 is positioned in the waveguide housing 13 in the installed state. The intermediate pipe 29 contacts the inner wall 57 of the housing 13 over its full area, with the exception of gap 55, in the example shown. Due to the trapazoidial-like outer cross-section of the positioning element 27 in the undeformed state, said positioning element does not contact the intermediate pipe 29 over its full area, but rather only at the corner regions 59. Free spaces 60 are formed between said corner regions and can be used for the leading through of electrical lines and of the return conductor 25 (FIG. 1). Due to the positioning element 27 and to the intermediate pipe 29, the waveguide 19 in this example is held centered in the waveguide housing 13, on the one hand, and is protected from excessive deflections, shocks and vibrations, on the other hand.

FIGS. 3 to 8 show damping elements of different embodiments of the positioning sensor.

This region of the position sensor is shown at the top right in FIG. 1; the damping element 23 and the sleeve 24 surrounding it can be recognized in said region in the exploded representation of FIG. 1. An embodiment is shown in FIG. 1 as it is represented in FIG. 3.

FIG. 3 shows this region of the position sensor 11 in a schematic representation in greater detail. The waveguide 19 can be recognized which is configured as wave-shaped in the region 26. It is surrounded by a casting mold 24. Two-component silicone can e.g. be injected through the injection passage 70 into this casting mold and surrounds the wave-shaped waveguide 19 in the hollow space shown after the injection molding process and the hardening process. In this manner, the injected material becomes a damping element 23 after a correspondingly selected hardening process. Depending on the embodiment, the casting mold 24 can remain at the waveguide or it can be removed. The mixing ratio of the two silicone components of the injected material continuously changes during the injection process through the injection passage 70. The hardness of the hardened material changes in this manner when the components are selected such that one of the components has a greater hardness than the other one after the hardening. The two components of the silicone can thus e.g. be selected such that with a ratio of 1:1 a hardness of less than a Shore hardness of 0 is present, whereas a Shore hardness of 30 is present with a mixing ratio of 2:1. The hardness of the damping element 23 is in this respect set such that it increases in the arrow direction 72 shown. If the hardness increases in the arrow direction, a mechanical pulse, which propagates from the left along the waveguide 19 in FIG. 3, is first incident at a very soft elastomer material in order to minimize the reflection, wherein the material becomes harder along the path to the right due to the greater density and results in a greater damping.

FIG. 4 shows a damping element 23 of another embodiment in which the casting mold 24 has a conical extent in the left region of the damping element 23 in order to provide a further adaptation possibility with respect to the damping requirements. In a manner not shown, other shapes can also be selected to optimize an adaptation to the conditions.

Figure 5:
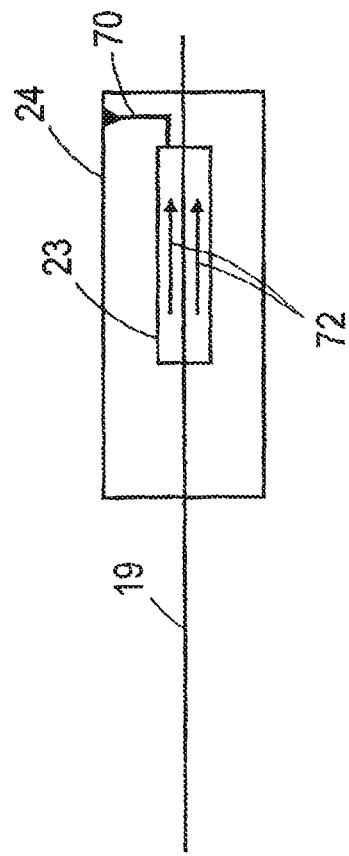
FIG. 5 is a schematic representation of a damping element of a third embodiment of the position sensor.

FIG. 5 shows a design in which the waveguide does not have the shape of a wave in the region of the damping element, but rather extends in a linear manner through the damping element.

Figure 6:
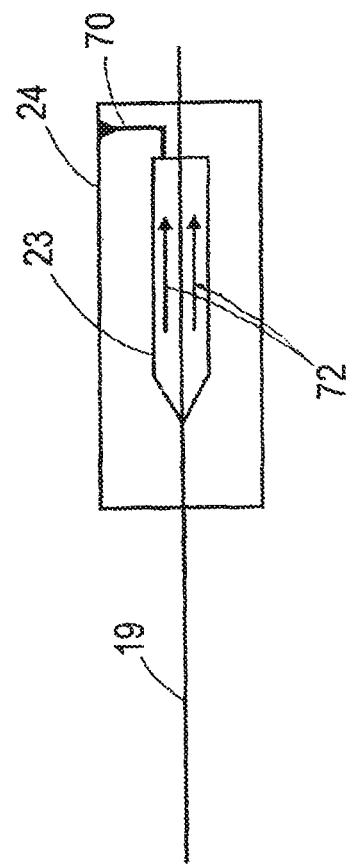
FIG. 6 is a schematic representation of a damping element of a fourth embodiment of the position sensor.

FIG. 6 shows an embodiment which corresponds to the design of FIG. 4 with a linear waveguide.

FIG. 7 shows a further embodiment in which the damping element 23 comprises individual elements 23', 23" and 23'". They are generated in a specific mold 24' in which the two-component silicone is introduced through three injection passages 70' to produce the damping element 23. In this respect, a different mixing ratio for the two components of the silicone is selected for the different regions 23', 23", 23'". A step-wise increase in the hardness of the damping element 23 can be achieved in this manner.

With the invention, a damping element is possible which combines the advantages of a simple casting process in the manufacture with the advantages of a damping element having a hardness increasing in the axial direction.

The present description frequently mentions silicone, in particular e.g. multicomponent silicone. Other materials having corresponding properties can likewise be used, for example polyurethane.

LIST OF REFERENCE NUMERALS 11 position sensor
13 waveguide housing
15 sensor head housing
17 end cap
19 waveguide
21 control unit
23 damping element
23', 23", 23'" individual element
24 sleeve
25 return conductor
27 positioning element
28 bent-over region
29 intermediate pipe
29' arrangement
30 transducer
31 bar magnet
32 coil
33 transducer receiver
35 circuit board
37 cover part
40 boundary
41 latching tooth
42 sealing ring
43 bead
44 support ring
45 contact pin
47 position magnet
50 recess
51 reception section
57 inner wall
59 corner region
60 free space
70 injection passage
72 increase in hardness
L longitudinal axis

The invention claimed is:

1. A position sensor comprising
a waveguide of magnetostrictive material which extends along a measurement path and which is configured for conducting mechanical pulses triggered by magnetostriction;
a transducer arranged at a first end of the waveguide, the transducer being configured to couple a current pulse into the waveguide and to detect a mechanical pulse conducted by the waveguide in the direction of the transducer; and
a damping element of an elastomer material arranged at a second end of the waveguide, the damping element being configured to damp a mechanical pulse propagating in the direction of the second end,
wherein the hardness of the elastomer material increases as the distance from the transducer increases,
wherein the elastomer material is formed directly at the waveguide with the aid of a casting process; and wherein the elastomer material is a material comprising at least two components whose mixing ratio determines the hardness of the elastomer material.

2. The position sensor in accordance with claim 1, wherein the hardness of the elastomer material in the damping element continuously increases as the distance from the transducer increases.

3. The position sensor in accordance with claim 1, wherein the mixing ratio of the components in the damping element changes continuously with the distance from the transducer.

4. The position sensor in accordance with claim 1, wherein the elastomer material is formed onto the waveguide with the aid of an injection molding process.

5. The position sensor in accordance with claim 1, wherein the waveguide has a non-linear extent within the damping element to extend the damping path.

6. A method of manufacturing a damping element of a position sensor, the position sensor comprising
a waveguide of magnetostrictive material which extends along a measurement path and which is configured for conducting mechanical pulses triggered by magnetostriction;
a transducer arranged at a first end of the waveguide, the transducer being configured to couple a current pulse into the waveguide and to detect a mechanical pulse conducted by the waveguide in the direction of the transducer; and
the damping element, wherein the damping element is formed of an elastomer material and is configured to damp a mechanical pulse propagating in the direction of the second end, wherein the hardness of the elastomer material increases as the distance from the transducer increases, and,
the method comprising the steps of:
casting the elastomer material around the second end of the waveguide in a casting process and wherein the casting process comprises the casting of a casting material comprising at least two different components whose mixing ratio is set along the damping element to be cast in dependence on the spacing from the transducer.

7. The method in accordance with claim 6, wherein the elastomer material is injection molded around the second end of the waveguide.

8. The method in accordance with claim 7, wherein the mixing ratio is changed continuously in dependence on the spacing from the transducer.

9. The method in accordance with claim 7, wherein the casting material comprises an at least two-component silicone material.

* * * * *